Nov. 28, 1939.   S. B. CALHOON   2,181,172
METER TESTING DEVICE
Filed May 18, 1937
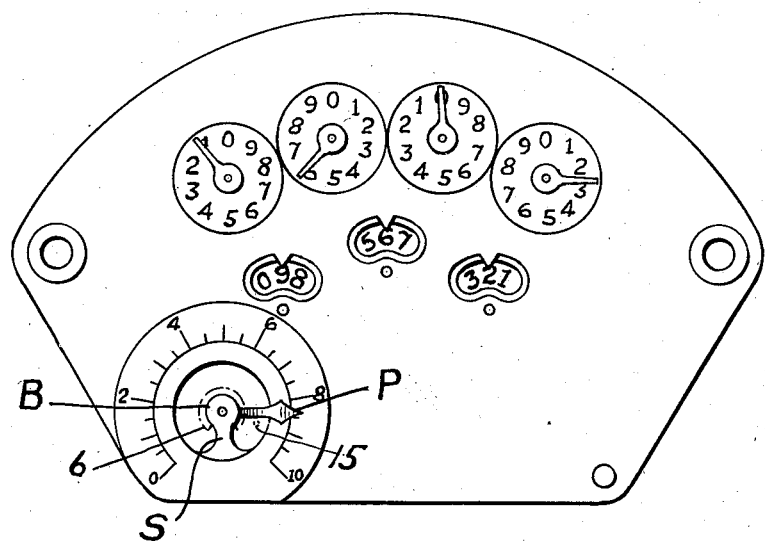
FIG.1.
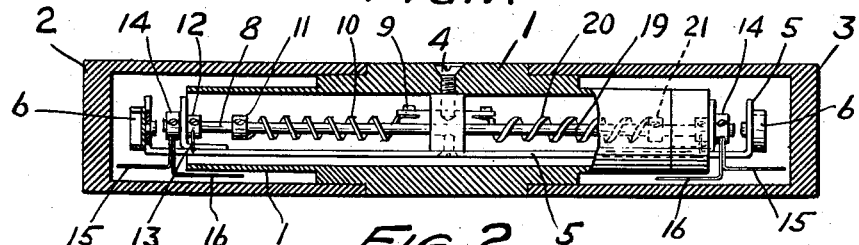
FIG.2.
FIG.3.   FIG.4.
FIG.5.
WITNESS:
INVENTOR
Stanley B. Calhoon
BY
Augustus B. Stoughton
ATTORNEY.

Patented Nov. 28, 1939

2,181,172

UNITED STATES PATENT OFFICE 2,181,172

METER-TESTING DEVICE

Stanley B. Calhoon, Philadelphia, Pa.

Application May 18, 1937, Serial No. 143,250

7 Claims. (Cl. 265—1)

Some electric meters, particularly demand meter registers, such as those made by the General Electric Company under Type M–21, or those made by The Westinghouse Electric & Manufacturing Company under Type RW2, contain as a part of their mechanism frictional clutches. In order that these meters be in proper operating condition, these clutches must slip when a torque within certain limits is applied to them.

The object of my invention is to provide a meter-testing device which insures that these clutches are in proper operating condition, or, in other words, slip when a torque within the desired limits is applied to them.

More specifically, my novel meter-testing device consists of a handle or operating support, a centering device pivotally attached thereto, a finger mounted on said handle and adapted to engage an indicator or pointer of the meter which in turn is connected to the clutch of the meter, a spring connected to said finger so as to yieldingly stress said finger against a stop in one direction of rotation, a pointer connected to said finger and rotatable therewith, and indicia on said handle and co-operating with said pointer to mark the high and low limits of the torque applied by said spring to said finger and hence to the clutch of the meter.

My device is capable of numerous modifications which will be readily apparent to those skilled in this art but I have illustrated below a preferred embodiment of my invention selected from among other for illustration in the drawing and description in the specification. To this specification and drawing, reference is here made for a detailed description of my device.

In the drawing:

Fig. 1 shows the meter dial of the General Electric Company's demand meter register Type M–21 which my device is adapted to test.

Fig. 2 is a longitudinal cross-section of my device with parts broken away.

Fig. 3 is a perspective view showing one of the operating ends of my device.

Fig. 4 is a perspective view showing an adapter for use with my meter-testing device with different meters.

Fig. 5 is a perspective view of a portion of a modification.

In Fig. 1 there is shown a meter face-plate having a pointer P which is connected to the meter clutch which is to be tested. Pointer P is mounted for rotation in a support or bearing B and will not be further described as the meter parts are well known and form no part of my invention.

Fig. 2 shows my novel meter-testing device consisting of a handle or operating support 1 having at each end thereof caps or covers 2 and 3 which serve to protect the operating parts of the device when carried in the pocket or hands of the user. Handle or operating support 1 has attached thereto, as by screw 4, a rigid carrier or support 5 at each end whereof is pivotally mounted a centering device 6 consisting, as is best seen in Fig. 3, of a flanged disk having an opening 7 in the flange thereof.

Rotatably mounted in carrier 5 are two shafts 8 and 19. Since my meter-testing device consists of two substantially duplicate parts, a description of one will suffice. Carrier 5 carries a screw 9 to which is attached one end of a spring 10, the other end of which is attached to shaft 8 by means of collar 11. Shaft 8 also carries a collar 12 which in turn carries a stop 13 which prevents further rotation of the shaft due to the pressure of spring 10 by engagement of stop 13 against a portion of carrier 5. Adjacent one end, shaft 8 carries a third collar 14 to which is attached a finger 15 which may have, either as a part thereof or as a separate part, a pointer 16. If desired, collar 12 and stop 13 may be omitted and the finger 15 prevent rotation of the shaft 8 in one direction by contact with part of carrier 5 as a stop. Adjacent its end, as is best seen in Fig. 3, handle 1 bears on its outer surface indicia 17 having legends "18" of which one is shown. It will be noted that springs 10 and 20 are wound in opposite directions and hence tend to turn shafts 8 and 19, respectively, in opposite directions.

The operation of my device is as follows: Handle 1 is grasped in the hand of the user and the centering device 6 slipped over the circular portion of bearing B, a cut-out portion 7 serving to receive the supporting portion S of the bearing B therein. This brings the finger 15 on one side or the other of the meter pointer P. Handle 1 is then twisted about centering device 6 as a pivot. Finger 15 is restrained from rotating by meter pointer P and hence rotates shaft 8 and causes spring 10 to coil up more tightly and hence to exert a greater torque on said meter pointer P. At the same time, tester pointer 16 moves over the surface of handle 1 to an extent which can be judged by reference to the indicia 17. When the torque of spring 8 is sufficient to overcome the resistance of the meter clutch, the clutch slips and meter pointer P moves. The point at which this movement takes place is indicated by movement of tester pointer 16 toward its normal position or position of rest. If this pointer lies between indicia 17, which is marked by the legend "Low", and another indicia (invisible in Fig. 3) marked by the legend "High" the clutch is in proper connection. If the point at which the slippage of the meter clutch takes place is shown on tester pointer 16 to be either too low or too high, the meter clutch is adjusted and is again tested until it is found that its resistance to slip lies within the desired limits.

As is seen in Fig. 2, spring 20 is coiled in the opposite direction to spring 10 and is used in exactly the same manner as described to test the slip of the meter pointer P in the opposite direction.

The stresses which springs 10 and 20 apply to shafts 8 and 19, respectively, can be adjusted by moving collars 11 and 21 along shafts 8 and 19, respectively.

For the purpose of testing more than one meter, testing devices having springs of different strengths may be used.

Other modifications of my invention will be readily apparent to those skilled in this art.

Fig. 4 shows an adapter which permits for meter-testing devices to be used with meters having bearings B and supports S of different sizes. The adapter consists of a disk 66 having on one side a shaft 67 of suitable size to fit within centering device 6 and having a key 68 adapted to interlock with opening 7 in the flange of centering device 6. Disk 66 carries on its opposite face a flange 69 of suitable size to fit about the bearing B of the different size. Flange 69 has a slot 70 therein to receive the support S of the meter of different size.

Fig. 5 illustrates my invention with a maximum torque-indicating attachment. The handle 1' is provided with an annular groove 75 in which slides a flat ring 76 which in turn carries a radially projecting stud 77. Ring 76 is rotatable in the groove 75 with very slight friction so that it will not be moved by inertia or the weight of stud 77. Stud 77 is positioned to be engaged and rotated by pointer 16 and is left at the position of maximum torque, when said pointer returns to the stop. Before the next reading the ring 76 is, of course, re-set to its zero position. This maximum indicator is particularly desirable when the device is used under conditions where the mechanism or meter test is not readily accessible for visual observation of the testing device.

My invention has been described as being used to determine the adjustment of a clutch, but it can be readily seen that the device is equally well adapted to the measurement or calibration of torsion springs or the like and also to the determination of the starting friction of a train of gears or other rotation transmitting mechanism.

Although I have described my device in connection with the testing of electric meters, it can be applied to the measurement of many devices which have springs, clutches, friction plates or friction-producing parts.

I do not intend to be limited save as the scope of the prior art and of the attached claims may require.

I claim:

1. A meter-testing device comprising, a handle, a centering device pivotally mounted on said handle, a finger pivotally mounted on said handle and projecting adjacent said centering device so as to engage a meter part, a spring stressing said finger against rotation in one direction, a stop holding said finger and said spring against rotation in the other direction, a pointer mounted for rotation with said finger, and indicia on said handle co-operating with said pointer to indicate the stress applied by said spring to said finger.

2. A meter-testing device comprising, a handle, a centering device pivotally mounted on said handle, a shaft pivotally mounted on said handle, a finger attached to said shaft and located adjacent said centering device, a spring tending to rotate said shaft and said finger in one direction, a stop preventing said shaft from rotating in said direction, a pointer connected to said shaft for rotation therewith, and indicia on said handle co-operating with said pointer to indicate the stress applied by said spring to said finger.

3. A meter-testing device comprising, a handle, a centering device mounted on said handle, a shaft pivotally mounted on said handle, a finger connected to said shaft, a spring stressing said shaft for rotation in one direction, a stop restraining said shaft against rotation by said spring, means for adjusting the stress of said spring on said shaft, a pointer connected to said shaft so as to rotate therewith, and indicia on said handle co-operating with said pointer for indicating the stress exerted by said spring on said finger.

4. An adapter for an electric meter-testing device comprising, a disk, a shaft projecting from one face of said disk, a key projecting radially from said shaft, and a flange extending from said disk in the opposite direction from said shaft, said flange having a notch therein opening from its end toward said disk.

5. A manually operable electric meter-testing device suitable for carriage in the pocket of the user and comprising, an operating support having a detachable cap housing the operating parts of the device, said operating parts including a centering device attached to said support, a finger pivotally carried by said support, a spring carried by said support and stressing said finger for rotation, a stop which prevents further rotation of the finger by the spring in one direction, and a pointer connected to said spring and co-operating with indicia on a portion of said support so that said pointer indicates the torque applied by said spring to said finger.

6. A manually operable, electric meter testing device suitable for carriage in the pocket of the user and comprising, a housing adapted for the grasp of the hand of the user, a centering device movably mounted on said housing for engagement with an electric meter part, an engaging and indicating element pivotally carried by said housing, a spring carried by said housing and stressing said element for rotation, a stop which prevents further rotation of said element by the spring in one direction, and indicia on a portion of said housing co-operating with said element so that said element indicates the torque applied by said spring to said element.

7. A manually operable, electric meter testing device comprising in combination, a barrel adapted to serve as a handle, a centering device movably mounted adjacent one end of said barrel for engaging an electric meter part, a rotatable shaft extending longitudinally of said barrel, means at one end of said shaft for abutting an element of an electric meter to be tested whereby a twist of said barrel would exert a turning effort on said shaft and for indicating the amount of such turning effort, a spiral spring mounted within said barrel for yieldably resisting such turning effort of said shaft, and indicia on said barrel co-operating with said means for indicating the amount of such turning effort.

STANLEY B. CALHOON.